(12) United States Patent
Bergerud et al.

(10) Patent No.: US 11,348,603 B2
(45) Date of Patent: May 31, 2022

(54) ONE OR MORE SLIDERS THAT INCLUDE A PROTECTIVE OVERCOAT THAT EXTENDS ACROSS THE ENTIRE AIR BEARING SURFACE

(71) Applicant: Seagate Technology LLC, Fremont, CA (US)

(72) Inventors: Amy Jo Bergerud, Minneapolis, MN (US); Iris Cheng Xiong, Maple Grove, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/375,681

(22) Filed: Jul. 14, 2021

(65) Prior Publication Data

US 2021/0343310 A1 Nov. 4, 2021

Related U.S. Application Data

(62) Division of application No. 16/847,254, filed on Apr. 13, 2020, now Pat. No. 11,094,339.

(51) Int. Cl.
*G11B 5/255* (2006.01)
*G11B 5/40* (2006.01)
(Continued)

(52) U.S. Cl.
CPC ............ *G11B 5/255* (2013.01); *G11B 5/3169* (2013.01); *G11B 5/40* (2013.01); *G11B 5/6082* (2013.01); *G11B 5/102* (2013.01); *G11B 5/3166* (2013.01); *G11B 5/3173* (2013.01); *Y10T 29/49041* (2015.01); *Y10T 29/49048* (2015.01)

(58) Field of Classification Search
None
See application file for complete search history.

(56) References Cited

U.S. PATENT DOCUMENTS 5,462,784 A * 10/1995 Grill et al. ............. G11B 5/255
428/835.2
5,853,959 A 12/1998 Brand et al.
(Continued)

FOREIGN PATENT DOCUMENTS

EP 2747082 B1 10/2017

OTHER PUBLICATIONS

Unpublished United States Utility U.S. Appl. No. 16/847,254, filed Apr. 13, 2020 (Not attached).

*Primary Examiner* — Craig A. Renner
(74) *Attorney, Agent, or Firm* — Kagan Binder, PLLC

(57) ABSTRACT

A slider comprises an air bearing surface having a leading edge at a first end of the air bearing surface; a trailing edge at a second end of the air bearing surface, wherein the first end is opposite to the second end; a first region adjacent to the trailing edge, wherein the first region comprises one or more transducer elements; and a second region adjacent to the first region and the leading edge. The air bearing surface has a protective overcoat layer as an outermost layer, wherein the protective overcoat layer extends across the entire air bearing surface. The air bearing surface comprises a lapped surface and a plurality of milled surfaces, wherein a surface potential difference between the lapped surface and a milled surface is 0+/−50 milliVolts or less as measured according to Kelvin Probe Force Microscopy (KPFM).

20 Claims, 4 Drawing Sheets

(51) Int. Cl.
*G11B 5/60* (2006.01)
*G11B 5/31* (2006.01)
*G11B 5/10* (2006.01)

(56) References Cited

U.S. PATENT DOCUMENTS

| | | |
|---|---|---|
| 6,569,295 B2 | 5/2003 | Hwang et al. |
| 6,949,004 B1 | 9/2005 | Broussalian et al. |
| 7,551,406 B1 | 6/2009 | Thomas et al. |
| 7,643,250 B2 | 1/2010 | Araki et al. |
| 8,165,709 B1 | 4/2012 | Rudy |
| 8,218,266 B2 * | 7/2012 | Shimizu et al. ......... G11B 5/40 360/235.8 |
| 8,419,905 B2 | 4/2013 | Ueda et al. |
| 9,437,233 B1 * | 9/2016 | Olson et al. ......... G11B 5/6005 |
| 9,792,935 B2 | 10/2017 | Rejda et al. |
| 2001/0018094 A1 * | 8/2001 | Tokisue et al. ...... G11B 5/6005 427/127 |
| 2003/0107842 A1 | 6/2003 | Sasaki et al. |
| 2003/0189794 A1 * | 10/2003 | Kameyama et al. .. G11B 5/255 360/235.8 |
| 2005/0005426 A1 | 1/2005 | Ohno et al. |
| 2005/0180048 A1 | 8/2005 | MacDonald et al. |
| 2005/0201012 A1 * | 9/2005 | Kasamatsu et al. . G11B 5/6082 360/235.1 |
| 2006/0168798 A1 | 8/2006 | Naka |
| 2006/0232885 A1 | 10/2006 | Heng et al. |
| 2007/0019323 A1 * | 1/2007 | Li et al. ................ G11B 5/6082 360/99.2 |
| 2007/0042154 A1 | 2/2007 | Hancer et al. |
| 2009/0310257 A1 * | 12/2009 | Musashi et al. ......... G11B 5/40 360/234.3 |
| 2010/0061009 A1 * | 3/2010 | Watanabe ................ G11B 5/40 360/122 |
| 2010/0208391 A1 | 8/2010 | Gokemeijer |
| 2011/0205665 A1 * | 8/2011 | Jones et al. .......... G11B 5/8408 360/110 |
| 2014/0131309 A1 | 5/2014 | Nishijima et al. |
| 2015/0002960 A1 * | 1/2015 | Stoebe et al. ........ G11B 5/6082 360/235.1 |
| 2019/0381629 A1 | 12/2019 | Rejda et al. |

* cited by examiner

ONE OR MORE SLIDERS THAT INCLUDE A PROTECTIVE OVERCOAT THAT EXTENDS ACROSS THE ENTIRE AIR BEARING SURFACE

CROSS-REFERENCE TO RELATED APPLICATIONS

This application is a divisional patent application of nonprovisional patent application titled "METHODS OF MANUFACTURING ONE OR MORE SLIDERS THAT INCLUDES A SECOND LAPPING PROCESSS AFTER PATTERNING, AND RELATED SLIDERS" by Bergerud et al. having application Ser. No. 16/847,254 filed on Apr. 13, 2020, wherein said nonprovisional patent application is incorporated herein by reference in its entirety.

BACKGROUND

The present disclosure relates to lapping and patterning of an air bearing surface of one or more sliders used in hard disk drives.

SUMMARY

The present disclosure includes embodiments of a slider. The slider includes an air bearing surface having:
 a) a leading edge at a first end of the air bearing surface;
 b) a trailing edge at a second end of the air bearing surface, wherein the first end is opposite to the second end;
 c) a first region adjacent to the trailing edge, wherein the first region comprises one or more transducer elements; and
 d) a second region adjacent to the first region and the leading edge,
wherein the air bearing surface has a fluorinated, protective overcoat layer as an outermost layer, wherein the fluorinated, protective overcoat layer extends across the entire air bearing surface.

DETAILED DESCRIPTION

Embodiments of the present disclosure include methods of manufacturing one or more sliders. A slider is used in a magnetic recording apparatus referred to as a hard disk drive (HDD). A slider "flies" above a disk by using air as a lubricant (an "air bearing"). For example, a disk can be placed on a spindle motor that can rotate and a negative pressure air-lubricated bearing slider can be attached at a suspension to correspond to the magnetic disk. The negative pressure air-lubricated bearing slider can be moved by an actuator that pivots so that the slider moves to a desired position on a track of the disk. The disk used as a recording medium has a circular shape and different information can be recorded on each track. In general, to obtain desired information, the slider moves in search of a corresponding track on the disk.

Figure 1:
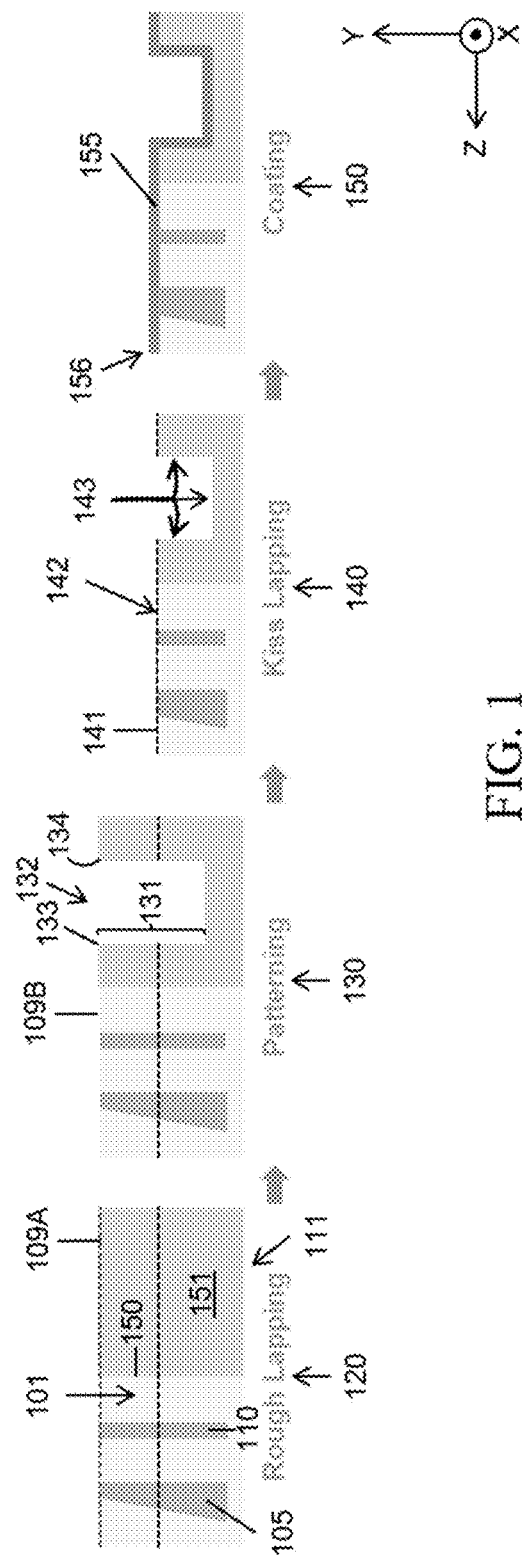
FIG. 1 illustrates a non-limiting embodiment of the present disclosure of a process flow for manufacturing a plurality of sliders.

In more detail, for illustration purposes, an embodiment of manufacturing one or more sliders according to the present disclosure is described with respect to FIG. 1 and includes a first lapping process 120, a patterning process 130, followed by a second lapping process 140, and then followed by a head overcoat process 150.

As used herein, the direction along the x-axis (out of the page of FIG. 1) is referred to as the cross-track axis. The direction along the z-axis is referred to herein as the down-track axis, with reference to trailing edge 156. The direction along the y-axis is referred to herein as the lapping direction (direction of material removal).

FIG. 1 shows a partial cross-section of a slider 111. In the context of the process illustrated in FIG. 1, slider 111 is one of a plurality of sliders adjacent to each other in a continuous row bar (not shown) that extends along the x-axis. Row bars can be cut from a wafer and individual, discrete sliders can be diced from a row bar. In some embodiments, a row bar according to the present disclosure can include at least 30 sliders, at least 60 sliders, or even at least 70 sliders.

As shown in FIG. 1 for the purposes of illustration, slider 111 includes a first region 101 and a second region 151. The first region 101 can be referred to as a transducer region. The first region includes one or more transducer elements related to operation of a hard disk drive. Non-limiting examples of such transducer elements include a magnetoresistive reader element, a magnetoresistive writer element, a near field transducer, combinations of these, and the like. For illustration purposes, FIG. 1 shows a magnetoresistive writer element 105 and a magnetoresistive reader element 110.

A slider according to the present disclosure can be mostly made out of ceramic material.

As shown in FIG. 1, slider 111 includes what is often referred to as an "AlTiC break" 150 because it divides the first region (including the transducer) from the second region 151. The region to the left of break 150 is the transducer region 101. The second region 151 is to the right of break 150. As shown in the partial cross-section of FIG. 1, a relatively small portion of the second region 151 is illustrated.

Sliders can be made of a variety of materials. In some embodiments, the bulk of the material in the second region 151 includes, but is not limited to, alumina titanium-carbide (also referred to as AlTiC). In some embodiments, the bulk of the material in the first region 101, with the exception of many of the electronic features in the transducer region 101, is a ceramic material. A non-limiting example of such a ceramic material is alumina. Elements such as magnetoresistive writer element 105 are made of magnetic materials such as cobalt-iron (CoFe), nickel-iron (NiFe), and the like.

A non-limiting example of a slider is described in U.S. Pub. No. 2019/0381629 (Rejda et al.), wherein the entirety of said patent publication is incorporated herein by reference.

Manufacturing sliders according to the present disclosure include a first lapping process 120 referred to as "rough lapping" that forms a first, lapped major surface or "pre-lapped" air bearing surface 109A. Rough lapping can be considered a relatively coarse lapping procedure used to remove relatively more material as compared to subsequent kiss lapping (discussed below). For example, rough lapping can remove up to 10,000 nanometers of material from a row bar in the lapping direction, or even up to 20,000 nanometers of material from a row bar in the lapping direction. In some embodiments, rough lapping can remove from 5,000 to 30,000 nanometers, or even from 10,000 to 20,000 nanometers of material from the major surface of the substrate in the lapping direction. As shown in FIG. 1, rough lapping ends with the first, lapped major surface 109A as a continuous, planar surface.

After rough lapping 120, the first, lapped major surface 109A can be patterned to form a patterned major surface 109B having an air bearing pattern. Patterning can include techniques such as photolithography (e.g., photoresist application, exposure, bake, development, and strip) and ion milling. For example, as illustrated in FIG. 1, at least a portion of the first major surface 109A is patterned, e.g., via ion milling to remove material at one or more locations 132 on the first major surface 109A in both the first region 101 and second region 151 to form a patterned major surface 109B having an air bearing pattern. For illustrations purposes, FIG. 1 shows patterning major surface 109A at a location in the second region 151 by, e.g., removing material by a depth of 131 to form at least a portion of the air bearing pattern that will ultimately be present in air bearing surface 141. Advantageously, an amount of stock material having a thickness that corresponds to the distance from first, lapped major surface 109A to air bearing surface 141 is present over at least a portion of the transducer region 101 that includes electronic devices such as the writer 105 and reader 110 during patterning of the first region 101 and second region 151 to protect electronic devices such as the writer 105 and reader 110 during patterning. Protective overcoats can therefore be avoided, if desired, during patterning.

In some embodiments, it is noted that because patterning occurs before kiss lapping there may be one or more sensitive elements that should be considered when manufacturing a slider according to the present disclosure. For example, one or more electronic lapping guides (ELGs) may be present, e.g. in the first region 101, and are intended to be used during rough lapping and subsequent kiss lapping. An ELG has an electrical resistance that can change as conditions change. For example, the electrical resistance of an ELG can increase as ELG material is removed during a lapping process and thus may be used to monitor lapping during kiss lapping to form air bearing surface 141. Accordingly, an ELG may be formed in a slider and the ELG resistance may be monitored during lapping. The resistance of an ELG can be correlated to material removed from an element that the ELG is associated with such as magnetoresistive writer element 105, magnetoresistive reader element 110, and/or a near-field transducer (not shown). Thus, the ELG can be used to target a desired dimension of the magnetoresistive writer element 105, the magnetoresistive reader element 110, and/or a near-field transducer. For example, an ELG can be used during lapping to target a height value for the magnetoresistive reader element 110 (e.g. reader stripe height target position) and another ELG can be used during lapping to target a height value for the magnetoresistive writer element 105. ELGs are also described in U.S. patent documents U.S. Pat. No. 7,551,406 (Thomas et al.), U.S. Pat. No. 7,643,250 (Araki et al.), U.S. Pat. No. 8,165,709 (Rudy), 2006/0168798 (Naka), and 2010/0208391 (Gokemeijer), wherein the entireties of said patent documents are incorporated herein by reference. Because patterning (e.g., milling) can occur before kiss lapping according to the present disclosure, one or more ELGs may be milled away or damaged to an undue degree if not accounted for. In some embodiments, one or more ELGs used for kiss lapping can be located appropriately so that they are not damaged to an undue degree during patterning and/or the design of the air bearing pattern can be managed so that the one or more ELGs used for subsequent kiss lapping are not damaged to an undue degree.

After patterning 130, the patterned major surface 109B of the substrate can be lapped via a second lapping process 140 referred to as "kiss lapping", which is a final lapping procedure. Kiss lapping can be considered a fine lapping procedure and can be used to remove fractions of material from each slider 111 in a row bar as compared to rough lapping. For example, referring to FIG. 1, kiss lapping can lap patterned major surface 109B to form a second, lapped major surface 141, which can be referred to as final air bearing surface 141. In some embodiments, kiss lapping can remove from 1 to 500 nanometers, from 1 to 300 nanometers, or even from 10 to 50 nanometers of material from the major surface of the substrate in the lapping direction. After kiss lapping, air bearing surface 141 has a lapped surface 142 and a milled surface 143, which form the exterior surface of the air bearing surface 141. Because patterning process 130 occurs before kiss lapping 140, the contact area of the patterned major surface 109B that a lapping plate (not shown) will be in physical contact with during kiss lapping is less than 100 percent. Thus, pressure and/or tilt angle can be adjusted accordingly to accommodate a given contact area. In some embodiments, patterned major surface 109B has a contact area with a lapping plate during kiss lapping process from 5 to 90 percent, from 10 to 80 percent, from 20 to 70 percent, or even from 30 to 60 percent. In some embodiments, patterned, major surface 109B has a contact area with a lapping plate during kiss lapping process from 10 to 50 percent.

Because patterning of the air bearing pattern occurs before kiss lapping, the patterned major surface 109B can have a non-uniform distribution of stock material in an air bearing pattern to be removed during kiss lapping. For example, there may be relatively less material to be kiss lapped near the trailing edge as compared to the leading edge. Such non-uniform distribution of stock material to be lapped can impact the contact pressure between a lapping plate and a row bar (and thus the lap-rate of material removal). In some embodiments, a row bar may be tilted as desired to help mitigate any non-uniform stock removal that may occur across the patterned, major surface 109B from leading edge to trailing edge of each slider in a row bar. For example, the row bar may be tilted during kiss lapping along the z-axis (down-track axis) at an angle from +5,000 to +50,000 micro radians or from −5,000 to −50,000 micro radians, from +10,000 to +40,000 micro radians or from −10,000 to −40,000 micro radians, or even from +15,000 to +35,000 micro radians or from −15,000 to −35,000 micro radians.

While not being bound by theory, it is believed that corners created during patterning may become rounded due to contact with a lapping plate during kiss lapping. Examples of such corners that may become rounded are illustrated in FIG. 1 as corners 133 and 134. In some embodiments, rounded corners may help mitigate or prevent damage caused by "op shock," which can occur when for example a hard disk drive is exposed to an impact (e.g., being dropped) that causes a slider in the hard disk drive to contact an underlying disk media. Corners that are rounded rather than sharp may be less likely to damage underlying media.

Figure 2A:
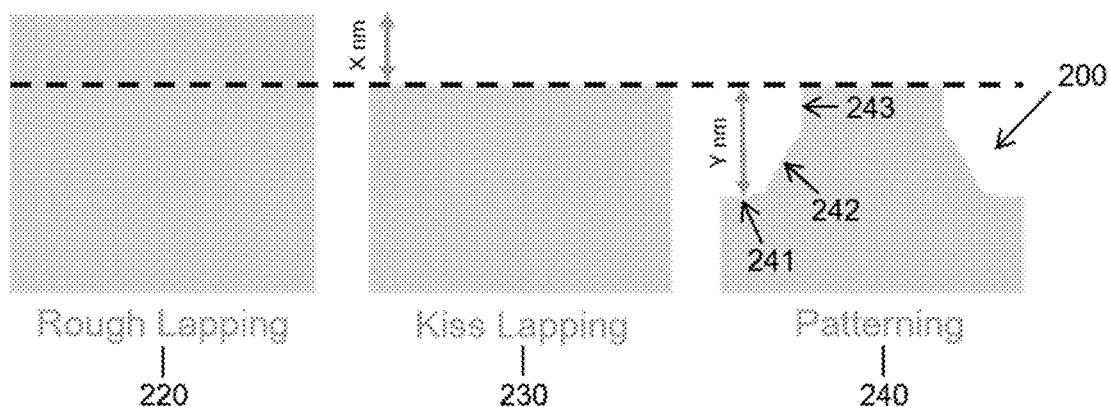
FIGS. 2A and 2B illustrate, respectively, a portion of a process flow for manufacturing a plurality of sliders as compared to a non-limiting embodiment of the present disclosure of a process flow for manufacturing a plurality of sliders.
Figure 2B:
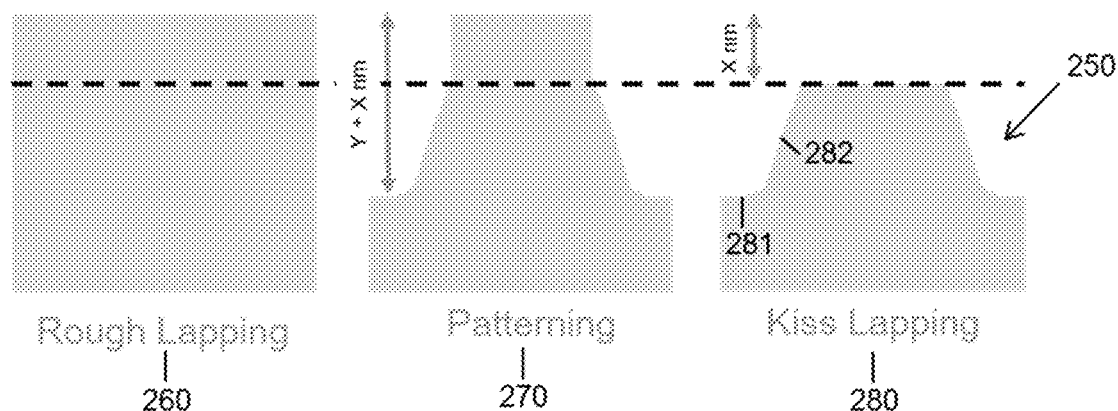

The cross-sectional profile of one or more patterned portions in an air bearing surface region can be influenced by performing patterning before kiss lapping. An example of this is shown in FIGS. 2A and 2B. As shown in FIG. 2A, manufacturing process 200 performs rough lapping 220, kiss lapping 230, and patterning 240 in sequence. As can be seen, kiss lapping removes "x" amount of material in the lapping direction from the entire surface. Afterwards, patterning 240 removes "y" amount of material from only a portion of the surface, thereby creating the cross-sectional profile shown in FIG. 2A at step 240, which includes a base portion 241, a transition portion 242, and a wall portion 243. As shown in FIG. 2B, manufacturing process 250 is similar to that shown in FIG. 1 in that it includes rough lapping 260, patterning 270, and kiss lapping 280 in sequence. As can be seen, patterning removes "x" plus "y" amount of material in the lapping direction from only a portion of the surface. Afterwards, kiss lapping removes "x" amount of material from the entire surface in contact with a lapping plate, thereby creating the cross-sectional profile shown in FIG. 2B at step 280, which includes the base portion 281 and at least part of the transition portion 282, but not a wall portion like wall portion 243 because it has been lapped away. In some embodiments, part of a wall portion may still be present after kiss lapping depending on how much material in the lapping direction has been removed during kiss lapping. Similarly, in some embodiments, even less of the transition portion 282 may be present after kiss lapping as compared to what is shown in FIG. 2B depending on how much material in the lapping direction has been removed during kiss lapping.

Kiss lapping 140 can be performed until a desired target is reached for a magnetic device and, in doing so, surface roughness of the lapped surface 142 tends to decrease as compared to surface 109A after rough lapping 120. In some embodiments, kiss lapping can form a lapped surface 142 having a surface roughness (Rq) from 1 to 5 Å as measured according to atomic force microscopy.

After kiss lapping, at least one protective overcoat layer 155 can be applied via one or more application processes 150 to the entire exterior surface of air bearing surface 141 including the lapped surface 142 and the milled surface 143 to provide chemical and/or physical protection.

A protective overcoat can be applied using a variety of techniques. A non-limiting example of applying a protective overcoat includes vacuum deposition (i.e. physical vapor deposition and/or chemical vapor deposition).

In some embodiments, a protective overcoat includes a material chosen from diamond-like carbon (DLC). In some embodiments, forming a protective overcoat can include applying an adhesion layer prior to applying a final overcoat such as DLC. For example, at least one adhesion layer 157 can be applied to the first region 101 and the second region 151 to improve the adhesion of a final protective overcoat 155 such as DLC to the air bearing surface 141 (e.g., alumina and AlTiC). Accordingly, the adhesion layer can be a material that adheres to dissimilar substrates of the air bearing surface (e.g., alumina and AlTiC) and transducer features (e.g., iron cobalt and nickel iron) and the final protective overcoat (e.g., DLC). In some embodiments, the adhesion layer can include oxide, carbide, and/or nitride such as alumina, silicon nitride, silica, titanium carbide, metal oxide, and combinations thereof. Adhesion layers and protective overcoats are described in U.S. Publication No. 2007/0042154 (Hancer et al.), wherein the entirety of said patent publication is incorporated herein by reference.

The protective overcoat can be applied to at least the first region 101 and the second region 151 of one or more sliders 111. In some embodiments, as shown in FIG. 1, the protective overcoat layer 155 extends across the entire exterior of the air bearing surface 141. A protective overcoat layer can protect at least transducer devices in first region 101 of the air bearing surface 141 from damage and/or contamination (e.g., particle contamination and/or chemical contamination). In addition, by coating the entire exterior surface of the air bearing surface 141 with a protective overcoat instead of leaving AlTiC exposed in the milled surfaces 143 (e.g., if patterning is performed after coating instead), the exterior surface of air bearing surface 141 can have a more uniform surface potential (smaller surface potential difference between lapped and milled surfaces), which, without being bound by theory, is believed to facilitate reduction in contamination such as particle contamination.

In some embodiments, the milled surfaces 143 of air bearing surface 141 having a protective overcoat can have a surface potential difference of +/−50 milliVolts or less, +/−20 milliVolts or less, +/−10 milliVolts or less, +/−5 milliVolts or less, or even +/−1 milliVolt or less, relative to the lapped surfaces such as 142 as measured according to Kelvin Probe Force Microcopy (KPFM).

Figure 3A:
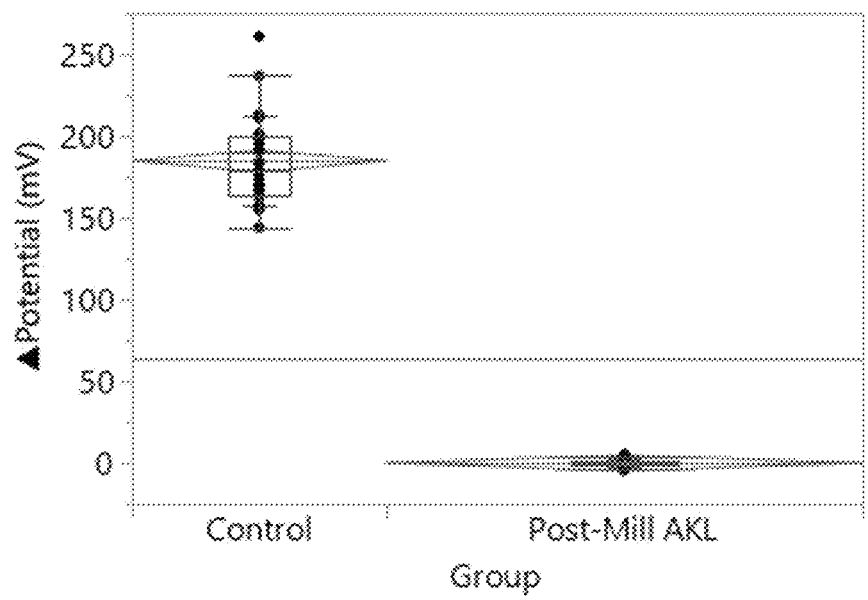
FIGS. 3A and 3B illustrate surface potential measurements of the air bearing surface of a control slider compared to a slider manufactured according to the present disclosure.
Figure 3B:
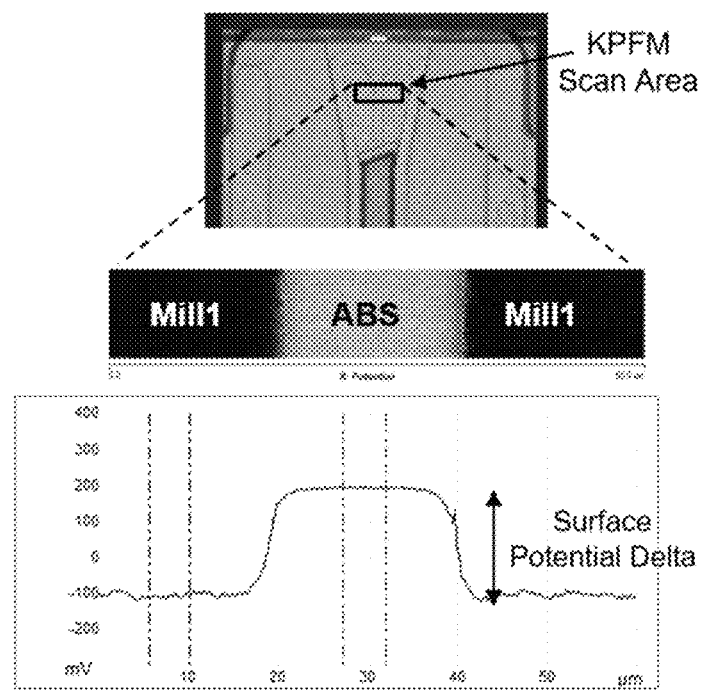
Figure 4:
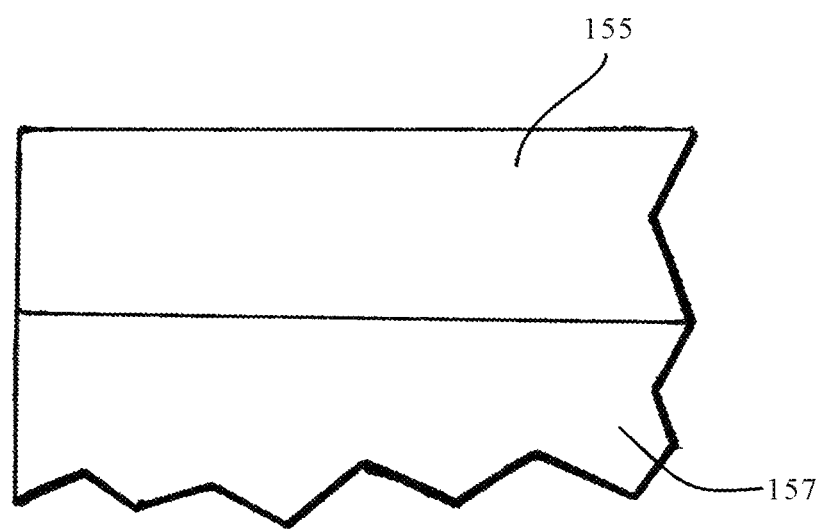
FIG. 4 is a schematic showing a partial cross-section of at least one adhesion layer according to the present disclosure.

For illustration purposes, FIG. 3A shows the surface potential difference for a representative portion of an air bearing surface for a "Control" slider and a slider according to the present disclosure ("Post-Mill AKL"). FIG. 3B shows the representative portion of an air bearing surface as indicated by "KPFM Scan Area". The "Control" slider shown in FIG. 3A was made by a sequence that included rough lapping, followed by kiss lapping, followed by applying a protective overcoat, followed by patterning such that the air bearing surface ("ABS") had protective overcoat but milled surfaces ("Mill1") did not have protective overcoat. Instead, the milled surfaces of the control slider had exposed AlTiC. In contrast, the "Post-Mill AKL" slider was made by a sequence shown in FIG. 1 so that both the milled surfaces and lapped surfaces of the air bearing surface had a protective overcoat (DLC). As can be seen in FIG. 3A, the "Control" slider had a surface potential difference between the milled surfaces and DLC-coated ABS surface of 185 milliVolts +/−27 milliVolts, as measured according to KPFM, whereas the "Post-Mill AKL" slider had a surface potential difference between the DLC-coated milled surfaces (e.g., 143) and DLC-coated ABS surface (e.g., 142) of 0 milliVolts +/−2 milliVolts, as measured according to KPFM.

Protective overcoat layer 155 can have a range of thicknesses. In some embodiments, the protective overcoat layer has a thickness from 5 to 100 Å, or even from 10 to 30 Å.

After applying the protective overcoat 155, a row bar of sliders 111 can be processed according to one or more optional processes. For example, the row bar can be diced into individual, discrete sliders 111.

As another example, at least the protective overcoat 155 of each slider can be treated either before or after dicing to modify the properties of the protective overcoat. For example, the protective overcoat can be treated to improve its contamination resistance properties. In some embodiments, the protective overcoat 155 can be modified to alter its surface energy (e.g., lower its surface energy). Non-limiting examples of such modifications include applying one or more self-assembled monolayers ("SAMs"), applying one or more surfactants, applying other chemical/polymeric coatings or treatments, combinations of these and the like. For example, protective overcoat 155 can be treated with a fluorine containing plasma to form a fluorinated protective overcoat. This can include ex-situ applications (e.g., plasma or ion beam etching of a protective overcoat after deposition) or in-situ applications (e.g., incorporating fluorine chemistry during vacuum deposition of protective overcoat).

Protecting transducer elements in the first region 101 from undue damage is a consideration when performing fluorination of a protective overcoat in-situ.

What is claimed is:

1. A slider comprising an air bearing surface having:
   a) a leading edge at a first end of the air bearing surface;
   b) a trailing edge at a second end of the air bearing surface, wherein the first end is opposite to the second end;
   c) a first region adjacent to the trailing edge, wherein the first region comprises one or more transducer elements; and
   d) a second region adjacent to the first region and the leading edge, wherein the air bearing surface has a protective overcoat layer as an outermost layer, wherein the protective overcoat layer extends across the entire air bearing surface, wherein the air bearing surface comprises a lapped surface and a plurality of milled surfaces, wherein a surface potential difference between the lapped surface and a milled surface is 0+/−50 milliVolts or less as measured according to Kelvin Probe Force Microscopy (KPFM).

2. The slider according to claim 1, wherein the protective overcoat layer comprises diamond-like carbon.

3. The slider according to claim 1, wherein the overcoat layer has a thickness in the range from 5 to 100 Å.

4. The slider according to claim 1, further comprising at least one adhesion layer underneath and in contact with the protective overcoat layer.

5. The slider according to claim 1, wherein the one or more transducer elements comprise at least a magnetoresistive reader element and a magnetoresistive writer element.

6. The slider according to claim 1, wherein the surface potential difference between the lapped surface and the milled surface is 0+/−2 milliVolts or less as measured according to Kelvin Probe Force Microscopy (KPFM).

7. The slider according to claim 1, wherein the protective overcoat layer is fluorinated.

8. A row bar comprising at least one slider according to claim 1.

9. A slider comprising an air bearing surface having:
   a) a leading edge at a first end of the air bearing surface;
   b) a trailing edge at a second end of the air bearing surface, wherein the first end is opposite to the second end;
   c) a first region adjacent to the trailing edge, wherein the first region comprises one or more transducer elements; and
   d) a second region adjacent to the first region and the leading edge, wherein the air bearing surface has a fluorinated, protective overcoat layer as an outermost layer, wherein the fluorinated, protective overcoat layer extends across the entire air bearing surface, wherein the air bearing surface comprises a lapped surface and a plurality of milled surfaces, wherein a surface potential difference between the lapped surface and a milled surface is 0+/−20 milliVolts or less as measured according to Kelvin Probe Force Microscopy (KPFM).

10. The slider according to claim 9, wherein the surface potential difference between the lapped surface and the milled surface is 0+/−10 milliVolts or less as measured according to Kelvin Probe Force Microscopy (KPFM).

11. The slider according to claim 9, wherein the surface potential difference between the lapped surface and the milled surface is 0+/−2 milliVolts or less as measured according to Kelvin Probe Force Microscopy (KPFM).

12. The slider according to claim 9, wherein the surface potential difference between the lapped surface and the milled surface is 0+/−1 milliVolts or less as measured according to Kelvin Probe Force Microscopy (KPFM).

13. The slider according to claim 9, wherein the protective overcoat layer comprises diamond-like carbon.

14. The slider according to claim 9, wherein the overcoat layer has a thickness in the range from 5 to 100 Å.

15. The slider according to claim 9, further comprising at least one adhesion layer underneath and in contact with the fluorinated, protective overcoat layer.

16. The slider according to claim 15, wherein the at least one adhesion layer comprises material chosen from oxide, carbide, nitride, and combinations thereof.

17. The slider according to claim 15, wherein the at least one adhesion layer comprises material chosen from alumina, silicon nitride, silica, titanium carbide, metal oxide, and combinations thereof.

18. The slider according to claim 9, wherein the air bearing surface has a surface roughness (Rq) from 1 to 5 Å as measured according to atomic force microscopy.

19. The slider according to claim 9, wherein the one or more transducer elements comprise at least a magnetoresistive reader element and a magnetoresistive writer element.

20. A row bar comprising at least one slider according to claim 9.

* * * * *